US011028824B2

(12) United States Patent
Garm (10) Patent No.: US 11,028,824 B2
(45) Date of Patent: Jun. 8, 2021

(54) WIND TURBINE BLADE WITH A TRAILING EDGE SPACING SECTION (71) Applicant: LM WP PATENT HOLDING A/S, Kolding (DK)

(72) Inventor: Jesper Hasselbalch Garm, Kolding (DK)

(73) Assignee: LM WP PATENT HOLDING A/S, Kolding (DK)

(*) Notice: Subject to any disclaimer, the term of this patent is extended or adjusted under 35 U.S.C. 154(b) by 110 days.

(21) Appl. No.: 15/577,020

(22) PCT Filed: May 25, 2016

(86) PCT No.: PCT/EP2016/061834
§ 371 (c)(1),
(2) Date: Nov. 27, 2017

(87) PCT Pub. No.: WO2016/189051
PCT Pub. Date: Dec. 1, 2016

(65) Prior Publication Data
US 2018/0142670 A1  May 24, 2018

(30) Foreign Application Priority Data
May 28, 2015 (EP) .................. 15169645

(51) Int. Cl.
F03D 1/06 (2006.01)
(52) U.S. Cl.
CPC ......... F03D 1/0641 (2013.01); F03D 1/0633 (2013.01); Y02E 10/72 (2013.01)

(58) Field of Classification Search
None
See application file for complete search history.

(56) References Cited

U.S. PATENT DOCUMENTS 8,092,187 B2 * 1/2012 Bell .................. F03D 1/06
416/224
8,789,275 B2 * 7/2014 Esaki ................ F03D 1/0675
29/889.7

(Continued)

FOREIGN PATENT DOCUMENTS

EP     2 604 856 A1    6/2013
WO   2014/049330 A1   4/2014

OTHER PUBLICATIONS

International Search Report dated Aug. 19, 2016 issued in corresponding International Application No. PCT/EP2016/061834.

Primary Examiner — Ninh H. Nguyen
Assistant Examiner — Jason Fountain
(74) Attorney, Agent, or Firm — Nath, Goldberg & Meyer; Jerald L. Meyer; Tanya E. Harkins (57) ABSTRACT A wind turbine blade is provided with two shell parts each at least partly made of a sandwich structure including an inner skin (76), an outer skin (74), and an intermediate core material (75, 77), wherein the shell parts are bonded together at least along their respective leading edges (18). The blade also comprises a longitudinally extending spacing section in which the respective trailing edges (58a, 58b) of the pressure side shell part and the suction side shell part are spaced apart, wherein a trailing edge shear web (45) is arranged between and connected to the sandwich structure of the suction side shell part (84, 86, 87) and the sandwich structure of the pressure side shell part (74, 76, 77).

19 Claims, 5 Drawing Sheets

(56) References Cited

U.S. PATENT DOCUMENTS

| | | | |
|---|---|---|---|
| 9,719,489 B2* | 8/2017 | Stewart | F03D 1/0675 |
| 9,739,260 B2* | 8/2017 | Garm | F03D 1/0675 |
| 10,428,790 B2* | 10/2019 | Smith | B29D 99/0028 |
| 2010/0094970 A1 | 4/2010 | Zuckerman et al. | |
| 2010/0143146 A1* | 6/2010 | Bell | F03D 1/06 |
| | | | 416/233 |
| 2010/0296940 A1* | 11/2010 | Zuteck | F03D 1/0683 |
| | | | 416/226 |
| 2011/0052408 A1 | 3/2011 | Zuteck | |
| 2014/0301859 A1* | 10/2014 | Hancock | B29C 70/84 |
| | | | 416/230 |
| 2015/0023799 A1 | 1/2015 | Wetzel et al. | |
| 2016/0319801 A1* | 11/2016 | Smith | B29C 70/547 |

\* cited by examiner

WIND TURBINE BLADE WITH A TRAILING EDGE SPACING SECTION

This is a National Phase Application filed under 35 U.S.C. 371 as a national stage of PCT/EP2016/061834, filed May 25, 2016, an application claiming the benefit of European Application No. 15169645.7, filed May 28, 2015, the content of each of which is hereby incorporated by reference in its entirety.

FIELD OF THE INVENTION

The present invention relates to a wind turbine blade with a spacing section at its trailing edge providing improved aerodynamic properties and structural stability.

BACKGROUND OF THE INVENTION

Modern wind turbines must be designed to withstand extreme loads, hostile environments and harsh weather conditions during their entire lifetime. This applies in particular to turbine blades which are the major elements for converting wind energy into electrical energy.

Wind turbine blades used for horizontal axis wind turbines can be rather large and may today exceed 70 metres in length and 4 metres in width. The blades are typically made from a fibre-reinforced polymer material and comprise a pressure side shell part and a suction side shell part. The cross-sectional profile of a typical blade includes an airfoil for creating an air flow leading to a pressure difference between both sides. The resulting lift force generates torque for producing electricity.

Typically, wind turbine blades are manufactured according to one of two constructional designs, namely a design where a thin aerodynamic shell is glued or otherwise bonded onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. The shear webs prevent the shell parts from collapsing and ensure a transfer of shear stresses from one shell part to the other.

For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure, and prevent excessive bending or buckling. Some blade designs use shear webs formed from beam members having I- or C-shaped cross-sections, the members having a main body with load-bearing flanges extending therefrom at opposed ends of the main body.

One method of manufacturing such I- or C-webs is through the provision of a sandwich panel body to which layers of fibre material are applied at the opposed ends in the shape of the desired flanges, the fibre material being infused with a resin and subsequently cured to form rigid flanges.

It is well-known to manufacture such shear webs in a suitably shaped mould structure, wherein a C-web can be manufactured using a relatively simple U-shaped mould, where the sandwich panel body extends between opposed walls of the mould structure, with the flanges formed through the layup of fibre material against said walls.

It is also generally known to provide wind turbine airfoils with a blunt trailing edge section, a design which is also known as flatback airfoils. Such blunt trailing edge sections are considered advantageous for a number of reasons, such as increased structural volume and ease of fabrication and handling. Flatback airfoils are also considered to improve the lift characteristics of the wind turbine blade.

US 2010/143146 A1 discloses a stiffening core positioned between two shell parts proximate the root region of the blade creating a flatback profile. The stiffening core has a surface extending between both shell parts at the trailing edge and comprises ribs on an inside surface for providing reinforcement and structural stiffness to the blade. The stiffening core is mounted to a portion of the shells by periodically spaced adhesive joints, preformed shear clips and outside corner mounting members.

US 2013/0094970 A1 relates to a wind turbine blade wherein the flatback airfoil is open at the trailing edge and wherein the shells are joined together by a trailing-edge spar extending longitudinally of the wind turbine blade between the pressure-side outer shell and the suction-side outer shell at a position nearer to the trailing edge.

US 2010/0143146 A1 discloses a wind turbine blade, which comprises a first shell portion, a second shell portion, and a trailing edge insert positioned between the first shell portion and the second shell portion. The trailing edge provides a section having a flatback profile. In a shown embodiment, the blade profile comprises three webs. Two of the webs are attached to portions having only fibre skins and a main web is attached between two spar caps of the blade. It is seen that all bond lines are formed in sections having fibre reinforcement layers only.

It has been found that the above-described prior art approaches do not always provide satisfactory structural stability and support.

It is therefore an object of the present invention to provide an alternative system and method for the manufacture of wind turbine blade components in form of shear webs, which provides for increased ease of manufacture and advantageously also with a reduced risk of structural failure.

It is another object of the present invention to provide a flatback airfoil with improved structural stability and support.

SUMMARY OF THE INVENTION

This is according to a first aspect obtained by a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a vertical direction, the blade further comprising:
- a profiled contour including a pressure side and a suction side, as well as a leading edge and a trailing edge with a chord having a chord length extending there between, the profiled contour, when being impacted by an incident airflow, generating a lift,
- a pressure side shell part at least partly made of a sandwich structure including an inner skin, an outer skin, and an intermediate core material,
- a suction side shell part at least partly made of a sandwich structure including an inner skin, an outer skin, and an intermediate core material, wherein the suction side shell part is bonded to the pressure side shell part at least along the respective leading edges of the shell parts,
- a longitudinally extending spacing section in which the respective trailing edges of the pressure side shell part and the suction side shell part are spaced apart, wherein
- a trailing edge shear web is arranged between and connected to the sandwich structure of the suction side shell part and the sandwich structure of the pressure side shell part.

It has been found by the present inventor that connecting the trailing edge shear web to the sandwich structures of the respective shell parts results in an unexpectedly improved structural support of the blade parts as well as in stronger adhesive joints and reduced crack propagation. Also, it has been found that owing to the fixed supported construction, the blade shell is less prone to buckling effects.

The trailing edge shear web is advantageously arranged near the trailing edge or may even form part of the trailing edge of the blade. The trailing edge shear web is the rearmost shear web, i.e. the one closest to the trailing edge of the blade.

Further, it is clear that the webs are directly bonded to the sandwich sections of the shell parts as opposed to shear webs connected between spar caps or connected to sections having fibre skins only.

Advantageously, the trailing edge shear web comprises two flanges at its opposing ends, wherein the flanges are connected to the sandwich structures of the respective shell parts. Preferably, the connection is provided by bonding the trailing edge shear web flanges to the sandwich structures using a suitable adhesive such as vinyl ester adhesive.

The spacing section will typically extend between 5-50% of the blade length, preferably 7-40%, and more preferably 10-30% of the blade length, e.g. around 22.5% of the blade length. The spacing section may advantageously have a proximal longitudinal end nearest the root end of the blade, the proximal longitudinal end starting at 5-20% of the blade length seen from the root end of the blade, preferably around 7-15% of the blade length seen from the root end of the blade, e.g. about 12.5% of the blade length seen from the root end of the blade. Similarly, the spacing section may advantageously have a distal longitudinal end farthest the root end of the blade, the distal longitudinal end being positioned at 20-60% of the blade length seen from the root end of the blade, preferably at 25-50% of the blade length seen from the root end of the blade, e.g. about 35% of the blade length seen from the root end of the blade. The spacing section may advantageously form a smooth transition from a root section of the blade, e.g. having a substantially circular profile, to an airfoil section of the blade.

Typically, the suction side shell part and the pressure side shell part will be bonded to each other along their respective leading edges and along part of their respective trailing edges, except for the longitudinally extending spacing section of the blade.

The inner and outer skins of the shell parts will typically be made of a fibre reinforced polymer material. The reinforcement fibres may for instance be glass fibres, carbon fibres, aramid fibres, metallic fibres, such as steel fibres, or plant fibres. The polymer may be epoxy, polyester or vinyl ester. The intermediate core material of the shell sandwich structure preferably comprises wood and/or polymer foam, most preferably balsa wood.

According to a preferred embodiment, the shell sandwich structure extends all the way to the respective trailing edges of the respective shell parts. This has been found to result in a particularly advantageous structural stability of the blade.

In one embodiment, the shell sandwich structure comprises an outer and inner intermediate layer adjacent to the intermediate core layer and an outer and inner skin layer adjacent to the respective outer and inner intermediate layers. In this embodiment, the skin layers may advantageously be made of triaxial glass fibre, the intermediate layers may be made of biaxial glass fibre and the intermediate core layer may be made of wood or polymer foam.

The blade will typically contain one or more additional shear webs placed closer to the leading edge as compared to the trailing edge shear web seen in the chordwise direction. Also, each of the shell parts will typically comprise a main laminate (or spar cap), the respective main laminates being connected via one or more shear webs other than the trailing edge shear webs. The former may have a C-shaped or I-shaped cross-section. As described above, such additional shear webs prevent the shell parts from collapsing and ensure a transfer of shear stresses from one shell part to the other. In another embodiment, each shell part comprises two main laminates (or spar caps).

For very long blades, the blade shells may further along at least a part of the longitudinal extent comprise an additional first main laminate in the pressure side shell, and an additional second main laminate in the suction side shell. These additional main laminates may also be connected via one or more shear webs.

In a preferred embodiment, the trailing edge shear web is arranged within a distance of 0.1 to 2 metres from the trailing edge of the suction side shell part in the chordwise direction. Preferably, the trailing edge shear web is arranged within a distance of 0.1 to 1 metres, more preferably 0.15-0.75 metres from the trailing edge of the suction side shell part in the chordwise direction According to another embodiment of the present invention, the distance between the respective trailing edges of the pressure side shell part and the suction side shell part in the vertical direction is between 0.2-2.5 metres in at least one point within the spacing section.

In a preferred embodiment, the trailing edge shear web is I-shaped or C-shaped.

According to another embodiment of the present invention, the blade comprises a sealing element for sealing a space between the respective trailing edges of the pressure side shell part and the suction side shell part in the spacing section.

In a preferred embodiment, the trailing edge shear web forms a blunt trailing edge or flatback section of the blade. Preferably, the trailing edge shear web is flush with the trailing edges of the respective shell parts at least along part of the longitudinal extension of the blade to form the flatback section. In this embodiment, the trailing edge shear web may advantageously be C-shaped.

According to another embodiment of the present invention, the trailing edge shear web comprises a main body with a sandwich construction comprising at least two skin layers enclosing a core, wherein the trailing edge shear web further comprises two load-bearing flanges extending therefrom at opposed ends of the main body. The core layer of the shear web sandwich construction may comprise a wood material, such as balsawood, and/or polymer foam, such as PVC foam. The flanges will typically comprise fibre material. Preferably, the fibre material is infused with a resin and subsequently cured to form rigid flanges.

In a preferred embodiment, each shell part comprises one or more spar caps integrated in the respective shell part, wherein the spar caps comprise a plurality of fibre layers. Spar caps are also called main laminates. The spar caps or main laminates are typically formed as fibre insertion comprising a plurality of fibre reinforcement layers, e.g. up to 20-50 layers. Also, the spar caps may comprise a plurality of different layers including unidirectional, biaxial and triaxial glass fibres.

According to another embodiment of the present invention, each spar cap is encapsulated between the inner and outer skin of a shell part, wherein a transition zone is provided between the spar cap and the adjacent intermediate core material of the respective shell part. Preferably, the transition zone comprises a wedge-shaped part of each core material extending into a corresponding cavity of the spar cap. Such configuration was found to result in increased structural stability of the blade.

In a preferred embodiment, the spacing section is located between the root end and a longitudinal distance of 10 metres from the root end of the blade.

The spacing section may extend along 1-10 metres of the blade.

According to another embodiment of the present invention, the position of the maximum chord length is located within the spacing section.

According to another embodiment of the present invention, the trailing edge shear web is fastened to the sandwich structures of the respective shell parts by one or more adhesive joints.

In a preferred embodiment, the material of the intermediate core includes one or more of balsawood and foamed polymer, such as polyurethane foam.

According to another embodiment of the present invention, the material of the inner and outer skins of the sandwich structure includes one or more of glass fibre, carbon fibre, fibre reinforced polymer and resin. The fibres may be unidirectional, biaxial or triaxial. The resin may include thermosetting resin such as polyester and epoxy resin.

According to another embodiment of the present invention, the sandwich structure further comprises one or more additional layers.

The spacing section may be formed such that the spacing between the trailing edge parts of the pressure side and the suction side first increases and then decreases in the spanwise direction of the blade. Accordingly, the spacing section may form a gradual transition to the root section of the blade and the airfoil section of the blade.

As used herein, the term "flatback section" refers to a trailing edge section in which the respective edges of the pressure side shell part and the suction side shell part are spaced apart from each other by the trailing edge shear web resulting in a blunt trailing edge provided by the trailing edge shear web. This shape is opposed to the sharp trailing edge of standard airfoils.

The blade has three mutually perpendicular directions: a longitudinal (or spanwise) direction, a chordwise direction and a perpendicular vertical direction (or flapwise direction).

It will be understood that any of the above-described features may be combined in any embodiment of the inventive blade as described.

DETAILED DESCRIPTION OF THE INVENTION

The invention is explained in detail below with reference to an embodiment shown in the drawings, in which.

DETAILED DESCRIPTION

Figure 1:
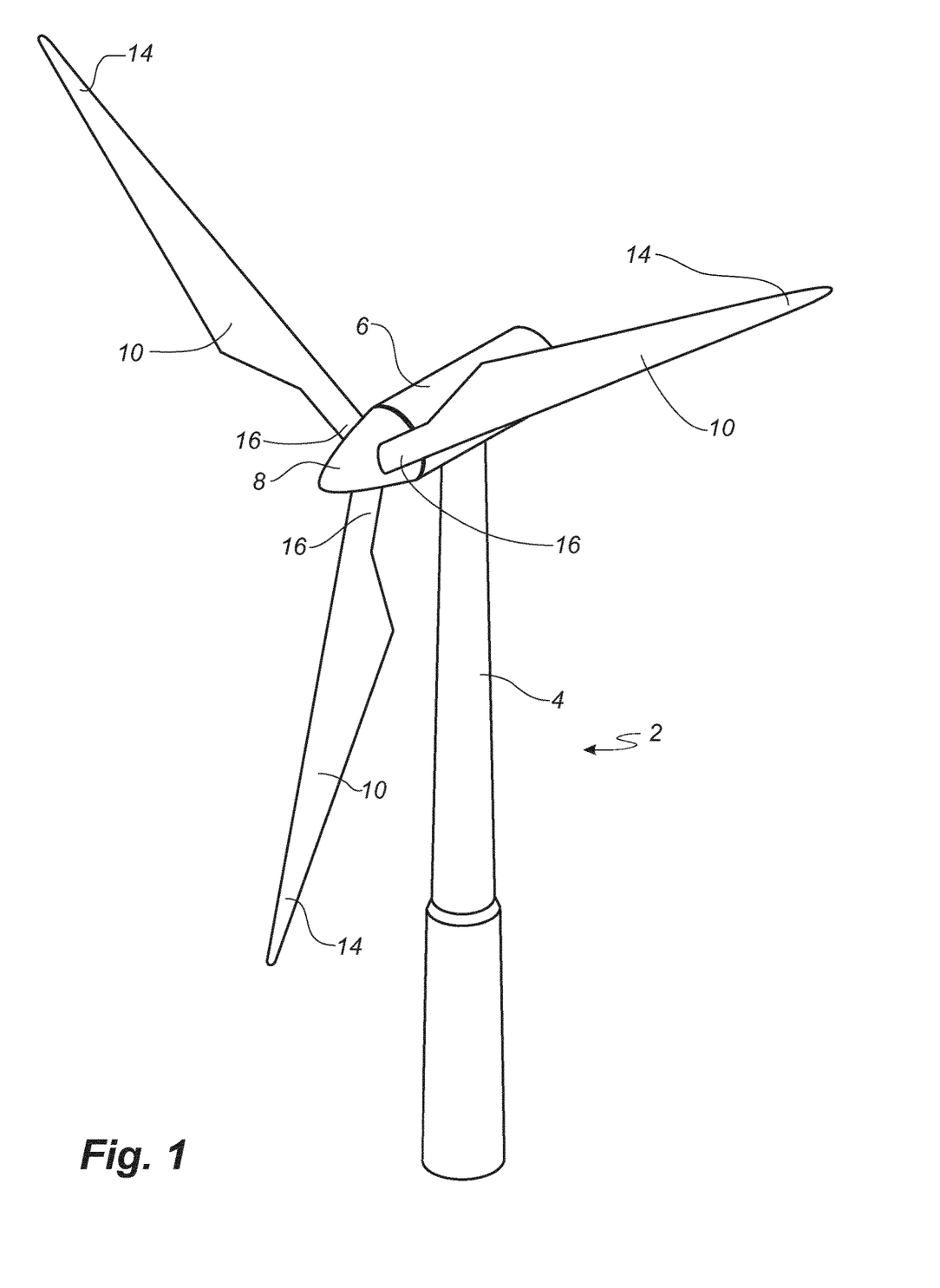
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
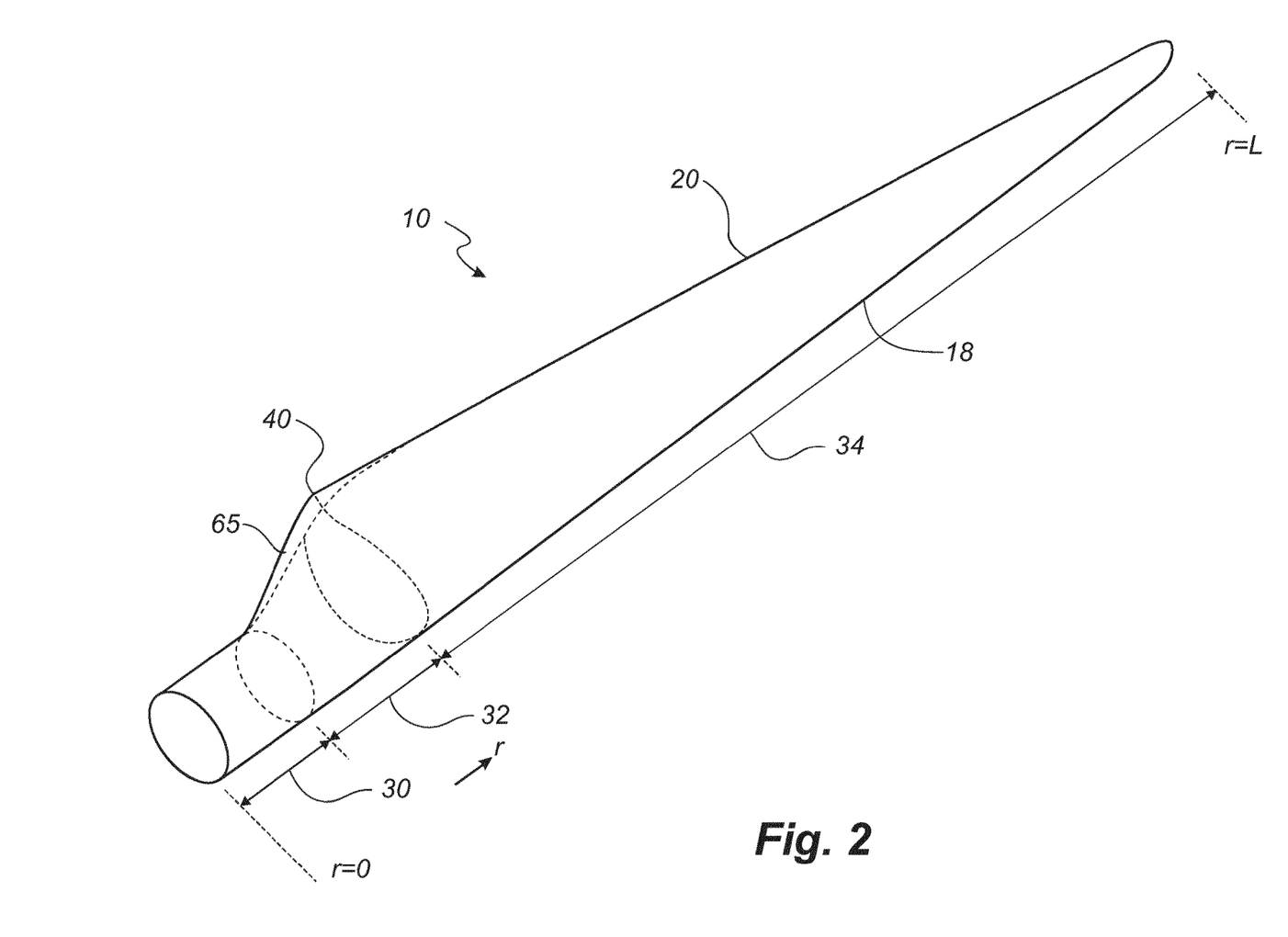
FIG. 2 shows a schematic view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

The blade according to the invention comprises a longitudinally extending spacing section 65, in which the trailing edge is formed such that a shell part of the suction side of the blade and a shell part of the trailing edge are spaced apart, e.g. so as to form a flatback profile section.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
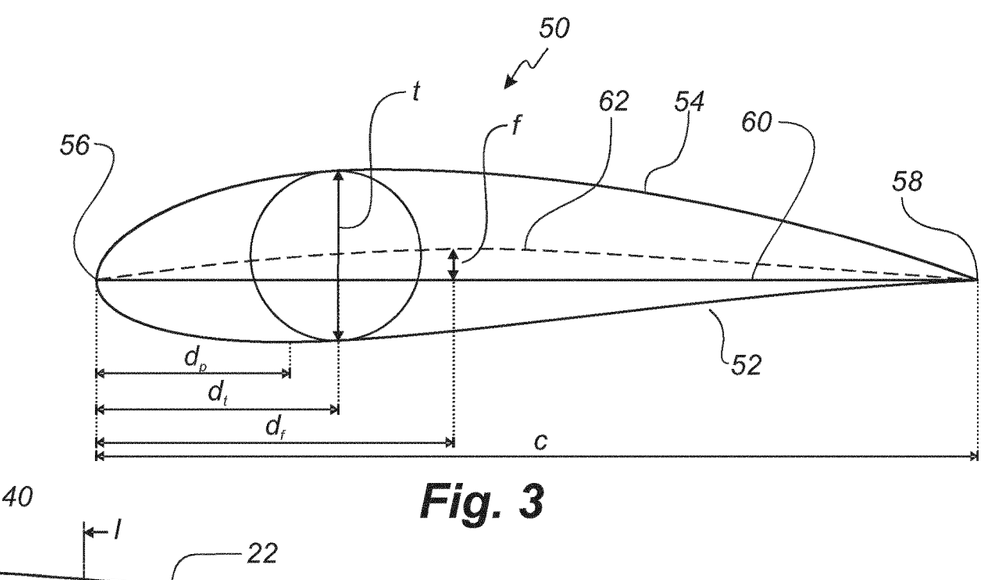
FIG. 3 shows a schematic view of an airfoil profile through section I-I of FIG. 4.
Figure 4:
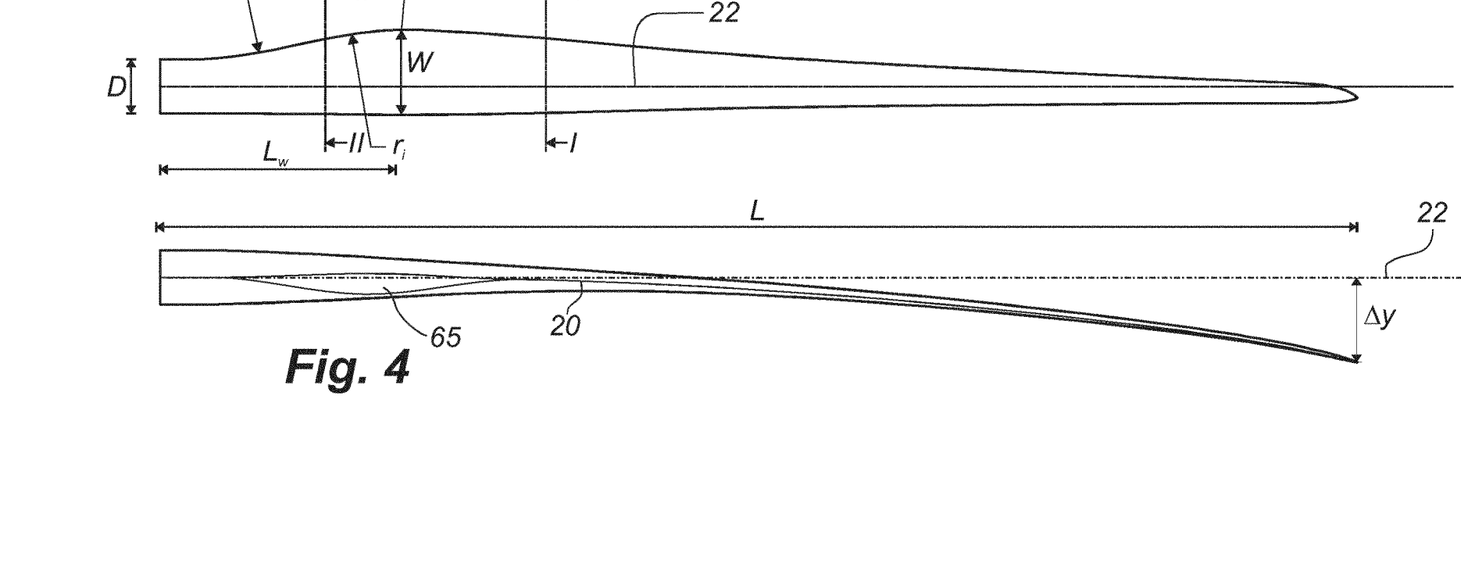
FIG. 4 shows a schematic view of the wind turbine blade according to the invention, seen from above and from the side.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length e. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade. FIG. 4 also shows the longitudinally extending spacing section 65.

The spacing section 65 may as shown in FIG. 2 be formed such that the spacing between the trailing edge parts of the pressure side and the suction side first increases and then decreases in the spanwise direction of the blade. Accordingly, the spacing section 65 may form a gradual transition to the root section 30 of the blade and the airfoil section of the blade.

Figure 5:
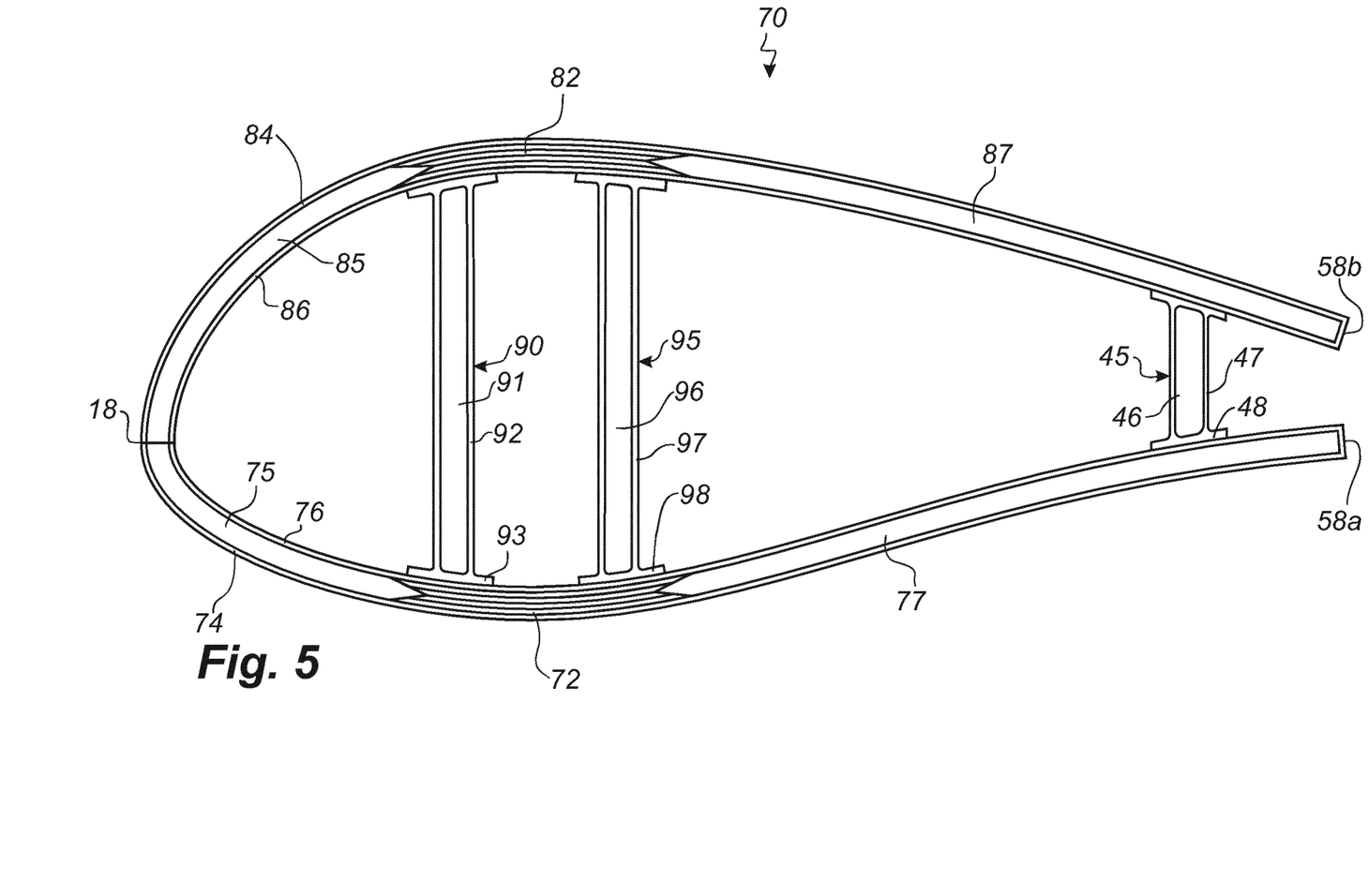
FIG. 5 shows a schematic view of a blade profile according to the invention along section II-II of FIG. 4.

FIG. 5 is a cross-sectional view of a blade profile 70 according to the invention taken along the line II-II in FIG. 4. The blade has a pressure side shell part comprising an outer skin 74 and inner skin 76 enclosing a first core material 75. Towards the trailing edge, the skins 74, 76 enclose a second core material 77. Likewise, the suction side shell part includes outer and inner skins 84, 86 adjacent to an intermediate first core material 85 towards the leading edge 18 and a second core material 87 towards the trailing edge. Spar caps 72, 82 are integrated in the respective shell parts, wherein each spar cap 72, 82 is encapsulated between the inner and outer skin of its respective shell part. A transition zone is provided between the spar caps 72, 82 and the adjacent intermediate core materials 85, 87, 75, 77 such that a wedge-shaped part of the core materials 85, 87, 75, 77 extends into a corresponding cavity of the respective spar cap laminate.

The blade in FIG. 5 also comprises a first I-shaped shear web 90 and a second I-shaped shear web 95 bonded to the spar caps 72, 82 with their flanges 93, 98. The first and second shear webs 90, 95 each comprise a sandwich construction with respective core materials 91, 96 enclosed by skin layers 92, 97. An I-shaped trailing edge web 45 is provided close to the trailing edge of the blade, the trailing edge shear web 45 equally comprising flanges 48 and a sandwich construction with a core material 46 enclosed by two skin layers 47. Due to the trailing edge shear web, the respective trailing edges 58a, 58b of the pressure side shell part and the suction side shell part are spaced apart.

Figure 6:
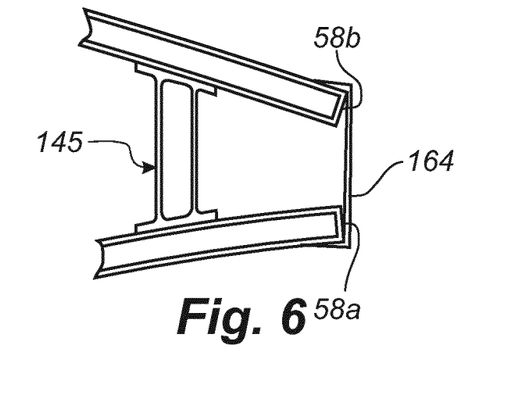
FIG. 6 shows one embodiment of a trailing edge design of a blade profile according to the invention.
Figure 7:
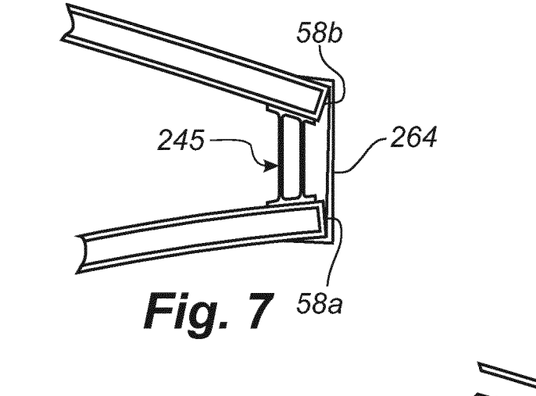
FIG. 7 shows a second embodiment of a trailing edge design of a blade profile according to the invention.
Figure 8:
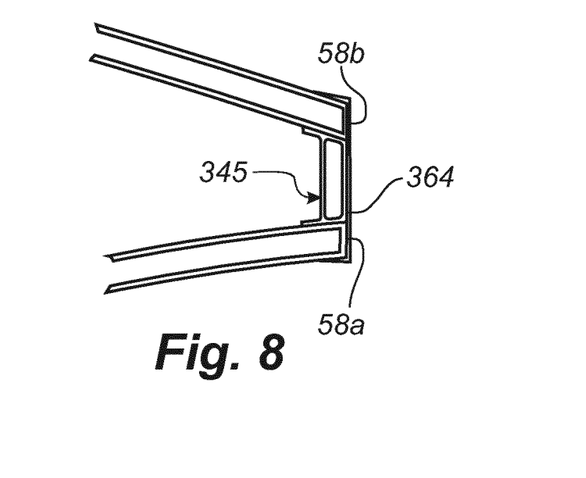
FIG. 8 shows a third embodiment of a trailing edge design of a blade profile according to the invention.

FIGS. 6-8 show cross-sections of other embodiments of trailing edge designs according to the present invention. In FIG. 6, an I-shaped trailing edge shear web 145 is provided close to the trailing edges 58a, 58b of the shell parts. The blade also comprises a sealing element (or cap) 164 for sealing a space between the respective trailing edges 58a, 58b of the pressure side shell part and the suction side shell part to the outside.

Similarly, the trailing edge design of FIG. 7 comprises an I-shaped trailing edge shear web 245 provided even closer to the trailing edges 58a, 58b of the shell parts. The blade also comprises a sealing element (or cap) 264. In FIG. 8, the trailing edge shear web 345 is flush with the trailing edges 58a, 58b of the shell parts, thus forming a flatback section or blunt trailing edge. This flatback section or blunt trailing edge may again be covered by an optional sealing element or overlamination 364, which is not only fixed to the respective trailing edges 58a, 58b, but also laminated to the trailing edge shear web 345. However, it is also contemplated to let the web itself form the blunt trailing edge without any overlamination.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
45, 145, 245, 345 trailing edge web
46 core material
47 skin layer
48 web foot flange
50 airfoil profile
52 pressure side
54 suction side
56 leading edge
58 trailing edge
58a trailing edge of pressure side shell part
58b trailing edge of suction side shell part
60 chord
62 camber line/median line
164, 264, 364 cap/sealant/over-lamination
65 spacing section
70 blade profile
72 pressure side (or upwind) spar cap (or main laminate)
74 outer skin of pressure side shell (e.g. glass fibres)
75 first sandwich core material of pressure side shell part
76 inner skin of pressure side shell part (e.g. glass fibres)
77 second sandwich core material of pressure side shell part
82 suction side (or downwind) spar cap (or main laminate)
84 outer skin of suction side shell part
85 first sandwich core material of suction side shell part
86 inner skin of suction side shell part
87 second sandwich core material suction shell part
90 first I-shaped shear web
91 core material
92 skin layer
93 web foot flange
95 second I-shaped shear web
96 core material
97 skin layer
98 web foot flange
c chord length
$d_t$ position of maximum thickness
$d_f$ position of maximum camber
$d_p$ position of maximum pressure side camber
f camber
L blade length
local radius, radial distance from blade root
t thickness
Δy prebend

The invention claimed is:

1. A blade (10) for a rotor of a wind turbine (2) having a horizontal rotor shaft, said rotor comprising a hub (8), from which the blade (10) extends in a radial direction when mounted to the hub (8), the blade having a longitudinal direction (r) with a tip end (16) and a root end (14) and a vertical direction, the blade further comprising:
  a profiled contour including a pressure side and a suction side, as well as a leading edge (18) and a trailing edge (20) with a chord having a chord length (c) extending therebetween, the profiled contour, when being impacted by an incident airflow, generating a lift;
  a pressure side shell part at least partly made of a sandwich structure including an inner skin (76), an outer skin (74), and an intermediate core material (75, 77);
  a suction side shell part at least partly made of a sandwich structure including an inner skin (86), an outer skin (84), and an intermediate core material (85, 87), wherein the suction side shell part is bonded to the pressure side shell part at least along the respective leading edges (18) of the shell parts; and
  a longitudinally extending spacing section (65) in which the respective trailing edges (58a, 58b) of the pressure side shell part and the suction side shell part are spaced apart,
  wherein a trailing edge shear web (45) is arranged at the trailing edge (20) of the blade (10) between and connected directly to the sandwich structure of the suction side shell part (84, 86, 87) at a position including the inner skin (86), the outer skin (84), and the intermediate core material (85, 87) of the sandwich structure of the suction side shell part, and the sandwich structure of the pressure side shell part (74, 76, 77) at a position including the inner skin (76), the outer skin (74), and the intermediate core material (75, 77) of the sandwich structure of the pressure side shell part.

2. The blade according to claim 1, wherein the trailing edge shear web (45) is arranged within a distance of 0.1 to 2 metres from the trailing edge of the suction side shell part in the chordwise direction.

3. The blade according to claim 1, wherein the distance between the respective trailing edges of the pressure side shell part and the suction side shell part in the vertical direction is between 0.2-2.5 metres in at least one point within the spacing section.

4. The blade according to claim 1, wherein the trailing edge shear web (45) is I-shaped or C-shaped.

5. The blade according to claim 1, wherein the blade comprises a sealing element (164, 264, 364) for sealing a space between the respective trailing edges (58a, 58b) of the pressure side shell part and the suction side shell part in the spacing section.

6. The blade according to claim 1, wherein the trailing edge shear web (345) forms a blunt trailing edge or flatback section of the blade.

7. The blade according to claim 1, wherein the trailing edge shear web (45) comprises a main body with a sandwich construction (46) comprising at least two skin layers (47) enclosing a core (46), wherein the trailing edge shear web (45) further comprises two load-bearing flanges (48) extending therefrom at opposed ends of the main body.

8. The blade according to claim 1, wherein each shell part comprises one or more spar caps (72, 82) integrated in the respective shell part, wherein the spar caps (72, 82) comprise a plurality of fibre layers.

9. The blade according to claim 8, wherein each spar cap (72, 82) is encapsulated between the inner and outer skin of a shell part (74, 76, 84, 86), wherein a transition zone is provided between the spar cap and the adjacent intermediate core material of the respective shell part.

10. The blade according to claim 1, wherein the spacing section is located between the root end and a longitudinal distance of 10 metres from the root end of the blade.

11. The blade according to claim 1, wherein the position of the maximum chord length is located within the spacing section.

12. The blade according to claim 1, wherein the trailing edge shear web (45) is fastened to the sandwich structures of the respective shell parts by one or more adhesive joints.

13. The blade according to claim 1, wherein the material of the intermediate core (85, 87) includes one or more of balsa, wood and foamed polymer.

14. The blade according to claim 1, wherein the material of the inner and outer skins of each of the sandwich structures of the pressure side shell part and of the suction side shell part (74, 76, 84, 86), respectively, includes one or more of glass fibre, carbon fibre, fibre reinforced polymer and resin.

15. The blade according to claim 1, wherein each of the sandwich structures of the pressure side shell part and of the suction side shell part, respectively, further comprises one or more additional layers.

16. The blade according to claim 13, wherein the foamed polymer comprises polyurethane foam.

17. A blade (10) for a rotor of a wind turbine (2) having a horizontal rotor shaft, said rotor comprising a hub (8), from which the blade (10) extends in a radial direction when mounted to the hub (8), the blade having a longitudinal direction (r) with a tip end (16) and a root end (14) and a vertical direction, the blade further comprising:

a profiled contour including a pressure side and a suction side, as well as a leading edge (18) and a trailing edge (20) with a chord having a chord length (c) extending therebetween, the profiled contour, when being impacted by an incident airflow, generating a lift;

a pressure side shell part at least partly made of a sandwich structure including an inner skin (76), an outer skin (74), and an intermediate core material (75, 77);

a suction side shell part at least partly made of a sandwich structure including an inner skin (86), an outer skin (84), and an intermediate core material (85, 87), wherein the suction side shell part is bonded to the pressure side shell part at least along the respective leading edges (18) of the shell parts; and a longitudinally extending spacing section (65) in which the respective trailing edges (58a, 58b) of the pressure side shell part and the suction side shell part are spaced apart, wherein a trailing edge shear web (45) is arranged at the trailing edge (20) of the blade (10) between and connected directly to the sandwich structure of the suction side shell part (84, 86, 87) at a position including the inner skin (86), the outer skin (84), and the intermediate core material (85, 87) of the sandwich structure of the suction side shell part, and the sandwich structure of the pressure side shell part (74, 76, 77) at a position including the inner skin (76), the outer skin (74), and the intermediate core material (75, 77) of the sandwich structure of the pressure side shell part, and wherein the trailing edge shear web (45) is spaced apart from the trailing edge of the suction side shell part in the chordwise direction.

18. The blade according to claim 17, wherein the trailing edge shear web (45) is arranged within a distance of 0.1 to 2 metres from the trailing edge of the suction side shell part in the chordwise direction.

19. The blade according to claim 18, wherein the trailing edge shear web (45) is arranged within a distance of 0.15 to 0.75 metres from the trailing edge of the suction side shell part in the chordwise direction.

* * * * *